US005745142A

United States Patent [19]

Liston

[11] Patent Number: 5,745,142

[45] Date of Patent: Apr. 28, 1998

[54] APPARATUS FOR POSITIONING A LINEAR PRINTHEAD IN AN ACCURATE POSITION WITH RESPECT TO A BELT OR WEB MEMBER

[75] Inventor: Christopher B. Liston, Rochester, N.Y.

[73] Assignee: Eastman Kodak Company, Rochester, N.Y.

[21] Appl. No.: 356,012

[22] Filed: Dec. 14, 1994

[51] Int. Cl.$^{6}$ .......... B41J 2/385; G03G 15/01; G01D 15/06

[52] U.S. Cl. .......... 347/116; 347/117; 347/138

[58] Field of Search .......... 347/138, 141, 347/242, 257, 116, 117; 355/212, 327; 399/162

[56] References Cited

U.S. PATENT DOCUMENTS

| | | | |
|---|---|---|---|
| 4,928,119 | 5/1990 | Walker et al. | 347/263 |
| 5,040,003 | 8/1991 | Willis | 347/118 |
| 5,121,145 | 6/1992 | Buch et al. | 347/118 |
| 5,208,633 | 5/1993 | Genovese | 355/212 |
| 5,229,787 | 7/1993 | Rees et al. | 347/115 |
| 5,272,493 | 12/1993 | Hubble et al. | 347/116 |
| 5,294,943 | 3/1994 | Blanding et al. | 347/257 |

FOREIGN PATENT DOCUMENTS

| | | | |
|---|---|---|---|
| 3216355 | 9/1991 | Japan | 347/116 |

OTHER PUBLICATIONS

European Patent Application 0 547 854, filed Dec. 14, 1992.
Research Disclosure Bulletin—May 1976, No. 14510, p. 29.

*Primary Examiner*—Benjamin R. Fuller
*Assistant Examiner*—L. Anderson
*Attorney, Agent, or Firm*—Norman Rushefsky

[57] ABSTRACT

A linear printhead is aligned across the direction of motion of a belt or web image member. The printhead is coupled to a roller supporting the belt which is castered about a caster axis. The castering of the roller causes it to align itself across the direction of motion of the image member. The printhead is responsive to this alignment of the roller for its own alignment.

14 Claims, 3 Drawing Sheets

APPARATUS FOR POSITIONING A LINEAR PRINTHEAD IN AN ACCURATE POSITION WITH RESPECT TO A BELT OR WEB MEMBER

This invention relates to a method and apparatus for positioning a linear printhead in an accurate position with respect to a belt or web image member. Although not limited thereto, it is particularly usable in systems in which multiple printheads are used to form combined images such as multicolor images on a belt or web image member.

U.S. Pat. No. 4,928,119 to Walker et al, granted May 22, 1990, shows a linear printhead assembly for positioning an LED printhead with respect to a moving belt. The LED printhead includes a linear LED array and a linear lens for projecting a linear image onto a position across a moving belt for image formation. The printhead is mounted in an assembly which includes a number of flexure members for urging four bearing surfaces against cylindrical roller bearing surfaces. The roller is fixed in the apparatus and supports the belt image member at that position. The flexure members are designed to hold the printhead assembly against the roller while permitting movement of the roller with respect to the frame of the apparatus to which the assembly is attached. The assembly prohibits motion of the printhead around the roller. This patent is hereby incorporated by reference herein.

U.S. Pat. No. 5,121,145 to Buch et al, granted Jun. 9, 1992, shows an image forming apparatus in which three linear printheads are arranged opposite rollers supporting a photoconductive belt image member for forming a three color image at fill process speed on a single frame. In-track registration of images is controlled by using a linear CCD element to monitor a perforation or other optical indicia as the indicia passes each printhead.

A number of other references show apparatus for controlling the registration of images in separate printheads, including U.S. Pat. Nos. 5,272,493 to Hubbell et al, granted Dec. 21, 1993; 5,229,787, granted to Rees et al Jul. 20, 1993; 5,040,003, granted to Willis Aug. 13, 1991; and 5,208,633 to Genovese, granted May 4, 1993; and EPO Application 547 854, published Jun. 23, 1993.

Many of the above references are designed to handle both in-track and cross-track registration of linear printheads in their most demanding application, that is, in combining images with different printheads to form a quality color image. However, neither cross-track nor in-track registration adjustments can fully handle all problems associated with a moving belt. Despite the highest quality of manufacturing, endless belts are produced with a small amount of unpredictable conicity. This is a well known problem. Many of the rollers supporting such a belt are typically castered to cause the roller to align itself with a belt that is not 100 percent cylindrical. For a discussion of web tracking principles with such a film belt, see Research Disclosure, May 1976, No. 14510, p. 29, which is incorporated by reference herein.

The conicity of a belt generally will cause the belt to have a varying amount of skew with respect to a linear printhead. This amount of skew is not usually noticeable in making single color images. However, if two images are to be combined and the amount of skew has changed between the formation of images, then a noticeable misregistration can result.

SUMMARY OF THE INVENTION

It is an object of the invention to improve the orientation of a linear printhead with respect to a moving belt.

This and other objects are accomplished by an image forming apparatus which includes a belt or web image member, a linear printhead extending across the path of the image member, and a roller supporting the image member and associated with the printhead. The roller is castered to align itself across the direction of motion of the image member. The printhead is coupled to the roller to align the printhead also across the direction of motion of the image member.

According to a preferred embodiment, the printhead and roller are mechanically coupled so that the roller movements are translated mechanically to the printhead.

According to another preferred embodiment, the printhead and roller are electrically coupled through a servosystem which maintains orientation between the printhead and the roller.

The invention is usable in any image forming apparatus using a linear printhead with a belt or web image member. However, it is of particular use in apparatus in which images are to be combined, especially to form multicolor images. With printhead orientation being responsive to a castered roller, each image is formed with the printhead in a predetermined orientation with the direction of motion of the image member, thereby eliminating skew when the images are combined. It is especially usable when more than one linear printhead is used to form combined images.

DETAILED DESCRIPTION OF THE INVENTION

The invention is particularly usable with an endless belt image member of a type commonly used in electrophotographic and other image forming apparatus. Although less common, it is also usable with a web image member that, in fact, has ends, which is also known in the art.

Figure 1:
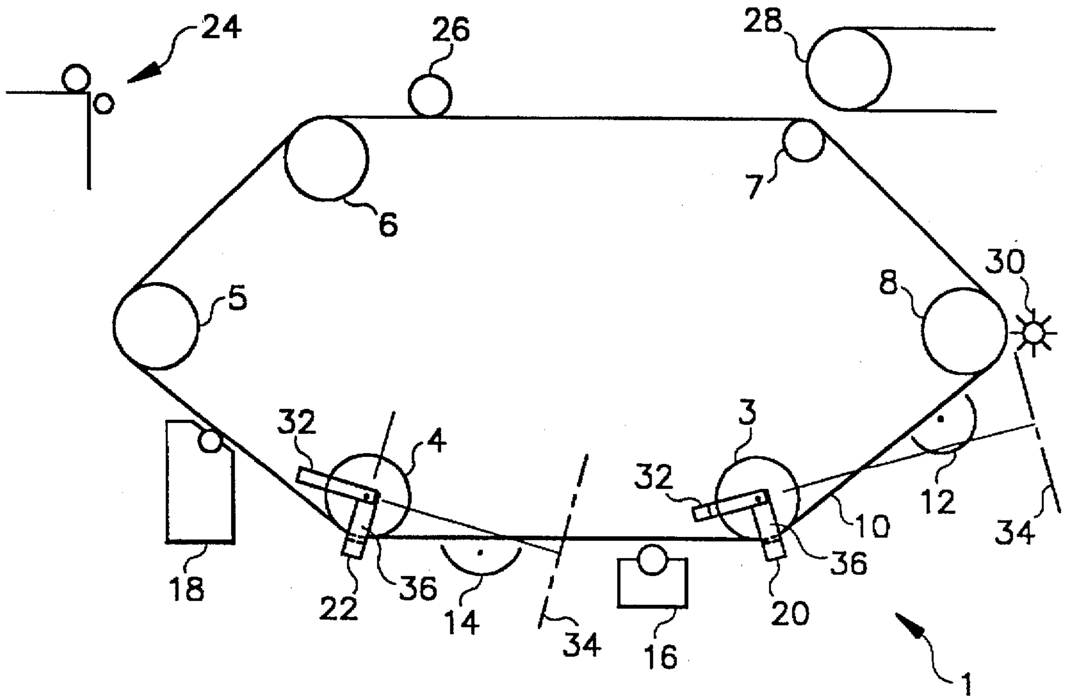
FIG. 1 is a side schematic of an image forming apparatus.

Referring to FIG. 1, an image forming apparatus 1 includes an endless belt image member 10 trained around a series of rollers 3, 4, 5, 6, 7 and 8. As shown in FIG. 1, the image member 10 is an electrophotographic image member having one or more photoconductive layers which makes it useful in forming toner images electrophotographically. The invention could also be used with other types of image forming apparatus using a linear printhead and a belt or web image member and is not limited to electrophotography.

Image member 10 is uniformly charged by a charger 12 and imagewise exposed by a linear printhead 20 to create a first electrostatic image. The first electrostatic image is toned by a toning station 16 to create a first toner image. The image member is again charged by a charging device 14 and imagewise exposed by a second linear printhead 22 to create a second electrostatic image in the same frame as the first toner image. This second electrostatic image is toned by a second toning station 18 which can apply a toner of a color different than that applied by the first toning station 16. A combined toner image is, thus, formed which can be a multicolor image. The combined toner image is transferred to a receiving sheet fed from a receiving sheet supply 24 to a transfer station 26. After transfer, the receiving sheet is separated as the image member goes around a small roller 7 and transported by a transporting device 28 to a fuser, not shown, where the image is fixed. The image member 10 is cleaned by a cleaning device 30 for continuous use.

This general type of apparatus is known. One of its most serious problems is accurate registration of the two or more images. Many solutions have been suggested for both cross-track and in-track misregistration, including moving one or more of the printheads in response to sensed marks, or the like, indicating the position of image member 10. Most of these solutions deal with cross-track registration which is caused by the wandering of the belt in a cross-track direction. However, endless belts are never absolutely cylindrical. Further, they vary in their conicity from belt to belt and within an individual belt. Therefore, endless belts are susceptible to a small amount of skew which is difficult to detect and very difficult to correct for. To handle such belts, rollers are castered at an axis generally upstream of the roller, which allows the roller to be oriented by the belt to a position in which the roller's axis is perpendicular to the direction of movement of the belt at any time. For more information about the control of such belts, see the Research Disclosure publication referred to above.

As shown in FIG. 1, both rollers 3 and 4 are castered about axes 34 and will be forced by the belt to align across the direction of movement of the belt. Printheads 20 and 22 are mechanically coupled to follow their roller as it moves about the caster axes 34 and, in turn, align themselves across the direction of motion.

Figure 2:
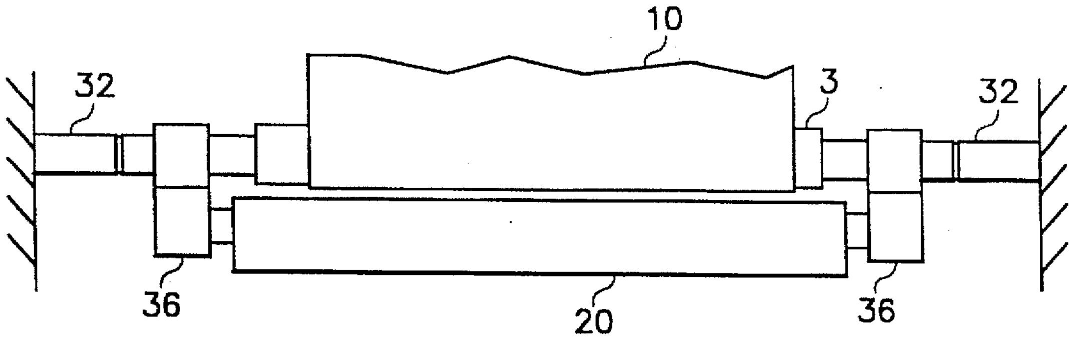
FIGS. 2 and 3 are views of a printhead-roller assembly, taken at right angles to each other.
Figure 3:
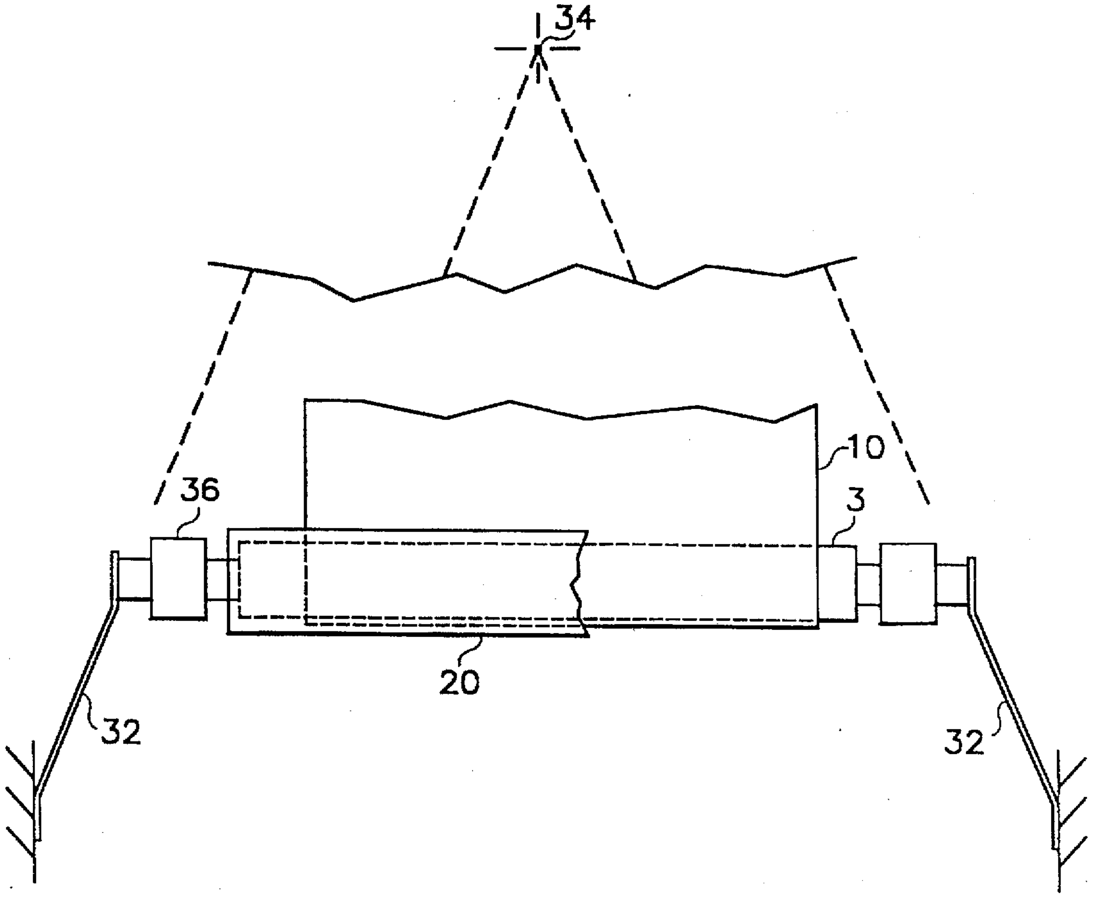

The actual construction of roller 3 and printhead 20 is shown better in FIGS. 2 and 3. Image member 10 moves around roller 3. As shown in FIG. 3, flexible castering mounts 32, conventional in the art, support roller 3 for movement about caster axis 34 to be aligned by image member 10 perpendicular to the direction of motion of image member 10. Printhead 20 is connected to roller 3 through printhead support arms 36 (FIG. 2) which are fixed to the roller bearing housing. Thus, as the conicity of image member 10 forces a rotation of roller 3 about axis 34, printhead 20 also rotates and aligns itself also perpendicular to the direction of motion of image member 10. Flexible castering mounts 32 can extend either upstream or downstream. Many other castering mechanisms known in the art can also be used.

Thus, despite variations in the conicity of image member 10, both printheads 20 and 22 are aligned perpendicular to the direction of image member 10 at all times. When a particular portion of image member 10 is imaged by printhead 22, it will necessarily be oriented in the same way that printhead 20 was oriented with that portion. Thus, registration will be accurate despite any skew imparted to image member 10 by the conicity of the belt.

Figure 4:
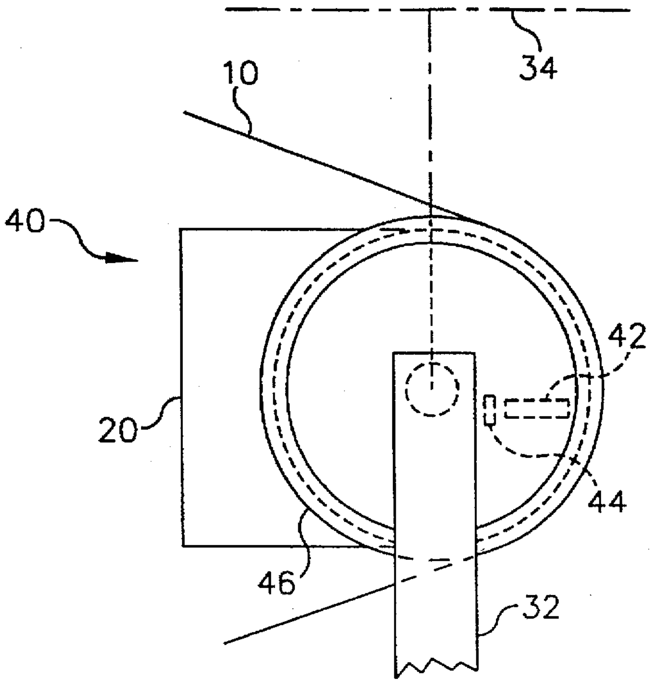
FIGS. 4 and 5 are side views of alternative printhead-roller assemblies.
Figure 5:
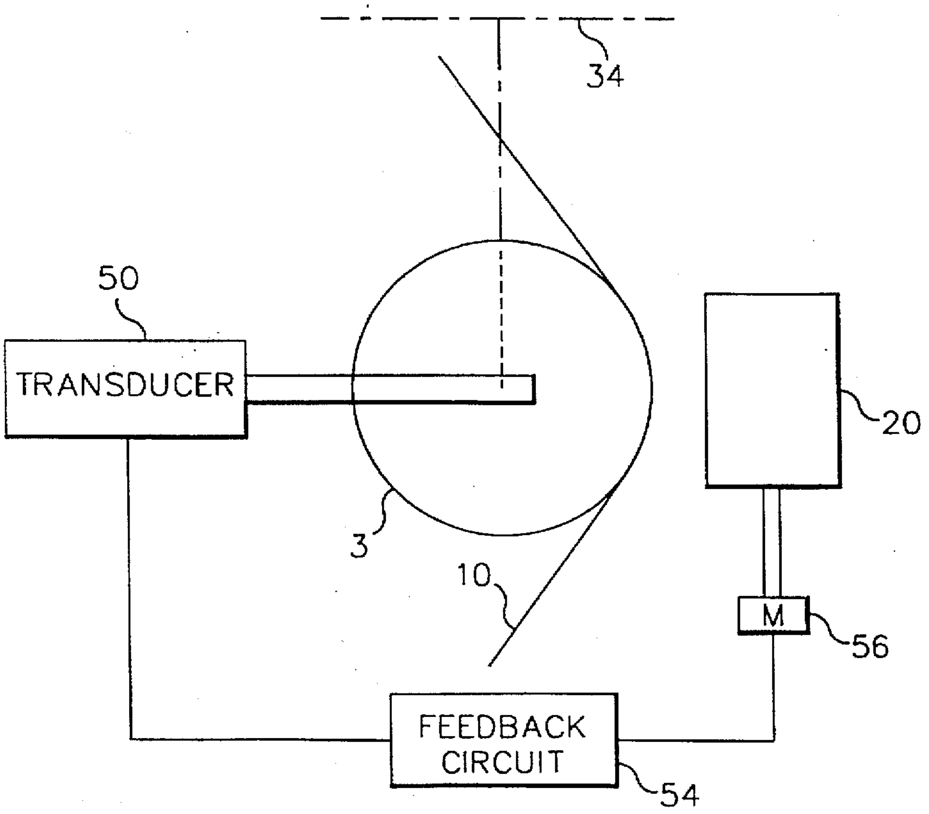

FIGS. 4 and 5 show alternative embodiments in which the printhead and roller are coupled somewhat differently than FIGS. 1–3. Referring to FIG. 4, the printhead is located on the same side of image member 10 as is the roller. The roller is now essentially rotatable endcaps 46 that contact image member 10 and are supported by flexible caster support arms 32. Printhead 20 is fixed with respect to support arms 32 and also the axis of endcaps 36 so that it follows the aligning process of the endcaps. The printhead includes a linear LED array 44 and a seltic or other linear lens array 42 which is typical for such linear printheads.

FIG. 5 illustrates printhead 20 and roller 3 coupled electrically. For example, a transducer 50, is sensitive to the angular position of roller 3 with respect to axis 34. As transducer 50 detects a movement around axis 34 by roller 3, it sends a signal through a conventional feedback circuit 54 to a servomotor 56 which, in turn, orients printhead 20 to essentially follow roller 3 to maintain its position with respect to the direction of motion of image member 10.

In FIGS. 1–4 the printheads 20 and 22 are shown entirely supported by the roller and its support. However, the printhead can be supported by a structure attached to the frame of apparatus 1 and more independent of rollers 3 and 4. For example, the printhead can be mounted to the frame using a series of flexure members, as shown in U.S. Pat. No. 4,928,119 referred to above. The flexure members force the printhead into a coupled following relation with the roller but without forcing the roller to support the printhead.

Although the invention is shown with respect to a preferred embodiment having a two printhead system, it can be used with any number of printheads. For example, single printhead systems are presently used to combine images as in FIG. 1 with each image formed on a separate cycle of image member 10. According to another preferred embodiment, the invention provides improved registration in systems in which two or more images are formed on separate frames of an image member and then are combined at transfer. Such systems conventionally use a single printhead. In such a system, best results are achieved if a transfer roller or belt is also coupled to a castered roller. A receiving sheet carried by the transfer roller or belt is then maintained with the same orientation to the belt as is the printhead for each of the images being combined.

The invention has been described in detail with particular reference to a preferred embodiment thereof, but it will be understood that variations and modifications can be effected within the spirit and scope of the invention as described hereinabove and as defined in the appended claims.

I claim:

1. Image forming apparatus comprising:

a belt or web image member moving in an in-track direction of motion, a linear printhead extending in a cross-track direction across the image member generally transverse to the in-track direction of the image member, a roller supporting the image member, a castor support supporting the roller for castering movement to align the roller in a direction across the direction of motion of the image member, and a coupling connection between the printhead and the roller to align the printhead also in a direction across the direction of motion of the image member in response to alignment of the roller.

2. Image forming apparatus according to claim 1 wherein the coupling connection is a mechanical coupling.

3. Image forming apparatus according to claim 2 wherein the printhead and roller form a single print-roller unit on one side of the image member.

4. Image forming apparatus according to claim 2 wherein the printhead and the roller are located on opposite sides of the image member and wherein the coupling connection includes a pair of arms that extend around the image member to connect the printhead and the roller.

5. Image forming apparatus according to claim 1 wherein the coupling connection an electro-mechanical connection between the printhead and the roller.

6. Image forming apparatus according to claim 5 further including means for sensing orientation of the roller with respect to a caster axis and means for creating an electrical signal indicative of the orientation and means for adjusting orientation of the printhead with respect to the caster axis in response to said signal.

7. Image forming apparatus according to claim 1 wherein the image forming apparatus includes means for forming a plurality of single colored images and combining those images in registration, the means for forming a plurality of single-colored images including said linear printhead.

8. Image forming apparatus according to claim 7 wherein said image member is an endless photoconductive belt and said means for forming a plurality of single-colored images includes one toning station for each image to be combined and further includes at least one charger.

9. Image forming apparatus according to claim 8 wherein said means for forming a plurality of single-colored images includes at least one linear printhead for each image to be combined and each of said printheads is coupled to a different castered roller.

10. A printhead-roller unit for use with a moving web or belt image member, said unit comprising:

a roller for supporting the image member during movement of the image member;

a castor support for supporting the roller for castering movement about a caster axis to align the roller with the image member across the image member;

a printhead;

a coupling connection connecting the printhead with the roller for movement of the printhead with the roller with respect to the caster axis so that movement of the roller about the caster axis provides alignment of the printhead with respect to the image member.

11. Image forming apparatus comprising:

a belt image member moving in an in-track direction of motion through an endless path, a first linear printhead extending in a cross-track direction across the image member for forming a first image on the image member, a first roller supporting the imaging member, the first roller being associated with the first printhead, a second linear printhead extending in a cross-track direction across the image member for forming a second image on the image member in registration with the first image, a second roller supporting the image member, the second roller being associated with the second printhead, a respective caster support supporting each of the rollers for respective castering movement of each roller to align each roller perpendicular to and across the direction of motion of the image member, and a respective coupling connection connecting each printhead to the associated roller for alignment of the printhead in a direction perpendicular to and across the direction of motion of the image member in response to castering movement of its associated roller.

12. Image forming apparatus according to claim 11 wherein the image member is a photoconductive belt and the image forming apparatus includes a charger positioned to uniformly charge the image member prior to the image member passing through operative relation with the first printhead, and wherein each printhead is positioned to imagewise expose the charged image member to create an electrostatic image and said image forming apparatus further includes means for applying different color toners to each electrostatic image to form different color toner images.

13. Image forming apparatus comprising:

a photoconductive belt image member trained about a series of rollers for movement through an endless path, means for uniformly charging the image member, first means for imagewise exposing the image member to form a first electrostatic image, means for applying a toner of a first color to the first electrostatic image to form a first toner image of a first color, second means for imagewise exposing the image member to form a second electrostatic image in registration with the first toner image, means for applying toner of a second color to the second electrostatic image to form a second toner image in registration with the first toner image to thereby form a multicolor toner image on the image member, wherein each of the first and second exposure means include an exposure providing element, a roller supporting the image member for exposure by the image exposure providing element, a caster supporting the roller for castering movement about a caster axis to align the roller with the image member, a coupling connection connecting the roller with the image exposure providing element for movement of the image exposure providing element with the roller with respect to the caster axis so that movement of the roller about the caster axis provides alignment of the image exposure provide element with respect to the image member.

14. An imaging apparatus for forming an image on a web moving in an in-track direction comprising a roller for supporting the moving web, a support responsive to movement of the web for supporting the roller for castering movement to align the roller with the web in a cross-track direction across the web;

an imaging element for forming an image on the web;

a coupling connection connecting the imaging element with the roller for castering movement with the roller so that castering movement of the roller provides castering movement of the image element to align the imaging element with the web in a cross-track direction of the web.

* * * * *